United States Patent
Lu et al.

(10) Patent No.: US 9,392,500 B2
(45) Date of Patent: *Jul. 12, 2016

(54) METHOD, APPARATUS, AND SYSTEM FOR PROCESSING EMPS IN A CSFB MECHANISM

(71) Applicant: Huawei Technologies Co., Ltd., Shenzhen (CN)

(72) Inventors: Wei Lu, Shanghai (CN); Fenqin Zhu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 14/825,953

(22) Filed: Aug. 13, 2015

(65) Prior Publication Data

US 2015/0350966 A1 Dec. 3, 2015

Related U.S. Application Data

(63) Continuation of application No. 14/548,667, filed on Nov. 20, 2014, which is a continuation of application No. 13/649,467, filed on Oct. 11, 2012, now Pat. No. 8,917,667, which is a continuation of application No. PCT/CN2010/071754, filed on Apr. 14, 2010.

(51) Int. Cl.
*H04W 36/00* (2009.01)
*H04W 8/14* (2009.01)
(Continued)

(52) U.S. Cl.
CPC ............ *H04W 36/0022* (2013.01); *H04W 4/22* (2013.01); *H04W 8/04* (2013.01); *H04W 8/065* (2013.01); *H04W 8/14* (2013.01); *H04W 76/026* (2013.01); *H04W 88/06* (2013.01)

(58) Field of Classification Search
CPC ....... H04W 36/022; H04W 4/22; H04W 8/04; H04W 8/14; H04W 76/026; H04W 88/06; H04W 8/065
See application file for complete search history.

(56) References Cited

U.S. PATENT DOCUMENTS

| | | | |
|---|---|---|---|
| 2009/0238143 A1 | 9/2009 | Mukherjee et al. | |
| 2010/0177629 A1* | 7/2010 | Payyappilly | H04W 36/0066 370/216 |

(Continued)

FOREIGN PATENT DOCUMENTS

| | | |
|---|---|---|
| CN | 1856155 A | 11/2006 |
| CN | 101222765 A | 11/2006 |

(Continued)

OTHER PUBLICATIONS

"3$^{rd}$ Generation Partnership Project; Technical Specification Group Services and System Aspects; Circuit Switched (CS) fallback in Evolved Packet System (EPS); Stage 2 (Release 9)," 3GPP TS 23.272, V9.3.0, pp. 1-66, 3$^{rd}$ Generation Partnership Project, Valbonne, France (Mar. 2010).

"3$^{rd}$ Generation Partnership Project; Technical Specification Group Services and System Aspects; General Packet Radio Service (GPRS) enhancements for Evolved Universal Terrestrial Radio Access Network (E-UTRAN) access (Release 9)," 3GPP TS 23.401, V9.4.0, pp. 1-258, 3$^{rd}$ Generation Partnership Project, Valbonne, France (Mar. 2010).

(Continued)

*Primary Examiner* — Paul H Masur
(74) *Attorney, Agent, or Firm* — Leydig, Voit & Mayer, Ltd.

(57) ABSTRACT

Embodiments of the present invention provide a method, an apparatus, and a system for processing an eMPS in a CSFB mechanism. The method in the embodiment of the present invention mainly includes: receiving a CSFB access request of a user equipment; determining that the user equipment has a CSFB priority service right according to acquired priority service information of the user equipment; and providing a CSFB access service preferentially for the user equipment with the CSFB priority service right.

18 Claims, 5 Drawing Sheets

(51) Int. Cl.
    *H04W 8/04*     (2009.01)
    *H04W 4/22*     (2009.01)
    *H04W 76/02*     (2009.01)
    *H04W 8/06*     (2009.01)
    *H04W 88/06*     (2009.01)

(56) References Cited

U.S. PATENT DOCUMENTS

| | | | | |
|---|---|---|---|---|
| 2010/0202413 | A1* | 8/2010 | Vikberg | H04W 36/0022 370/332 |
| 2010/0220680 | A1* | 9/2010 | Ramankutty | H04W 68/08 370/329 |
| 2010/0302937 | A1 | 12/2010 | Hu et al. | |
| 2010/0317378 | A1* | 12/2010 | Fang | H04W 36/0022 455/466 |
| 2011/0028120 | A1* | 2/2011 | Wu | H04W 36/0022 455/404.1 |
| 2011/0103277 | A1* | 5/2011 | Watfa | H04W 36/0033 370/310 |
| 2011/0149907 | A1* | 6/2011 | Olsson | H04W 60/005 370/331 |
| 2011/0216645 | A1* | 9/2011 | Song | H04W 36/0022 370/216 |
| 2011/0274038 | A1* | 11/2011 | Zhu | H04W 36/0022 370/328 |
| 2012/0069731 | A1* | 3/2012 | Tooher | H04W 76/026 370/221 |

FOREIGN PATENT DOCUMENTS

| | | |
|---|---|---|
| CN | 101494848 A | 7/2009 |
| JP | 2010063151 A | 3/2010 |
| JP | 2011166455 A | 8/2011 |

OTHER PUBLICATIONS

"3$^{rd}$ Generation Partnership Project; Technical Specification Group Core Network and Terminals; Evolved Packet system (EPS); Mobility Management Entity (MME) and Serving GPRS Support Node (SGSN) related interfaces based on Diameter protocol (Release 9)," 3GPP TS 29.272, V9.2.0, pp. 1-84, 3$^{rd}$ Generation Partnership Project, Valbonne, France (Mar. 2010).

"Presentation of Technical Report to TSG SA; TR 22.952, Version 2.0.0 Priority Service Guide," TSG-SA1 #22, Bangkok, Thailand, S1-031249, 3$^{rd}$ Generation Partnership Project, Valbonne, France (Oct. 27-31, 2003).

"Enhanced handling of RSP index at the MME," 3GPP TSG-SA2 meeting #75, Kyoto, Japan, S2-095991, 3$^{rd}$ Generation Partnership Project, Valbonne, France (Aug. 31-Sep. 4, 2009).

"Enhanced handling of RFSP index at the MME," 3GPP TSG-SA2 Meeting #75, Kyoto, Japan, S2-096004, 3$^{rd}$ Generation Partnership Project, Valbonne, France (Aug. 21-Sep. 4, 2009).

"1xCS Fallback MPS flows," 3GPP TSG SA WG2 Meeting #78, San Francisco, California, TD S2-101200, 3$^{rd}$ Generation Partnership Project, Valbonne, France (Feb. 22-26, 2010).

"1xCS Fallback MPS flows," 3GPP TSG SA WG2 Meeting #78, San Francisco, California, TD S2-101618, 3$^{rd}$ Generation Partnership Project, Valbonne, France (Feb. 22-26, 2010).

"3$^{rd}$ Generation Partnership Project; Technical Specification Group Services and System Aspects Enhancements for Priority Service (Release 10)," 3GPP TR 23.8xx, 0.2.0, pp. 1-20, 3$^{rd}$ Generation Partnership Project, Valbonne, France (Feb. 2010).

"CS Fallback priority handling of mobile originating call," 3GPP TSG SA WG2 Meeting #78, San Francisco, California, TD S2-101144, 3$^{rd}$ Generation Partnership Project, Valbonne, France (Feb. 22-26, 2010).

\* cited by examiner ns, and in particular, to a method, an apparatus, and a system for processing an eMPS (Enhanced Multimedia Priority Service, enhanced multimedia priority service) in a CSFB (Circuit Switched fallback, circuit switched fallback) mechanism.
METHOD, APPARATUS, AND SYSTEM FOR PROCESSING EMPS IN A CSFB MECHANISM

CROSS-REFERENCE TO RELATED APPLICATIONS

This application is a continuation of U.S. patent application Ser. No. 14/548,667, filed on Nov. 20, 2014, now U.S. Pat. No. 9,204,342, which is a continuation of U.S. patent application Ser. No. 13/649,467, filed on Oct. 11, 2012, now U.S. Pat. No. 8,917,667, which is a continuation of International Patent Application No. PCT/CN2010/071754, filed on Apr. 14, 2010. The afore-mentioned patent applications are hereby incorporated by reference in their entireties.

FIELD OF THE INVENTION

The present invention relates to the field of communications, and in particular, to a method, an apparatus, and a system for processing an eMPS (Enhanced Multimedia Priority Service, enhanced multimedia priority service) in a CSFB (Circuit Switched fallback, circuit switched fallback) mechanism.

BACKGROUND OF THE INVENTION

When an emergency or processing of an emergent affair occurs, a congestion of network resources may be caused. However, to ensure the work of people such as government officials, firemen and policemen using the normally used network resources, these people may be given the priority to use the network resources that these people can still access the network and acquire services during a network congestion. The service that a specific user has the priority to access the network is called eMPS.

An EPS (Evolved Packet System, an evolved packet system) is a new mobile communication network defined under the guidance of an evolved plan. Although the EPS has a new network framework, a lot of voice services of an operator run in a CS (Circuit Switched, circuit switched) domain of an original 2G or 3G network. To reuse the existing CS domain in the EPS, the industry provides a technology of connecting a CS domain core network to an EPS network through an MSC (Mobile Switch Center, mobile switch center) entity in a 2G or 3G network and falling back to the CS domain through the connection to execute the voice service. The technology is called CSFB. The main execution process of CSFB includes:

When a UE (User Equipment, user equipment) prepares to initiate a CS mobile originating (Mobile Originating, MO) service, the UE needs to switch to the 2G or 3G network preferentially and choose to camp on one 2G or 3G cell, and then starts the MO service; when the MSC entity receives one mobile terminated (MT, Mobile Terminated) service, through a SGs interface between the MSC entity and an MME (Mobility Management Entity, mobility management entity), the MSC entity sends an MT paging message to the MME, and the MME pages the UE through an EPS network; after receiving the MT paging message, the UE first needs to switch to the 2G or 3G network preferentially and choose to camp on one 2G or 3G cell, and then completes subsequent processing of the MT service.

If a network side fails to learn whether a UE has a priority access right when the eMPS needs to be performed in the CSFB mechanism, the network side fails to provide an eMPS service for the UE.

SUMMARY OF THE INVENTION

Embodiments of the present invention provide a method, an apparatus, and a system for processing an eMPS in a CSFB mechanism. A user equipment with an eMPS priority access right may get a corresponding priority service in the CSFB mechanism.

To achieve the preceding objective, embodiments of the present invention adopt the following technical solutions:

A method for processing an eMPS in a CSFB mechanism includes:

receiving a CSFB access request of a user equipment;
determining that the user equipment has a CSFB priority service right according to acquired priority service information of the user equipment; and
providing a CSFB access service preferentially for the user equipment with the CSFB priority service right.

An apparatus for processing an eMPS in a CSFB mechanism includes:

a receiving unit, configured to receive a CSFB access request of a user equipment;
an acquisition unit, configured to acquire priority service information of the user equipment;
a determination unit, configured to, after the receiving unit receives the CSFB access request, determine that the user equipment has a CSFB priority service right according to the priority service information of the user equipment acquired by the acquisition unit; and
a priority execution unit, configured to provide a CSFB access service preferentially for the user equipment with the CSFB priority service right determined by the determination unit.

A system for processing an eMPS in a CSFB mechanism includes:

a mobility management entity, configured to receive a CSFB access request of a user equipment, determine that the user equipment has a CSFB priority service right according to acquired priority service information of the user equipment, and provide a CSFB access service preferentially for the user equipment with the CSFB priority service right.

Technical solutions provided in the embodiments of the present invention have the following beneficial effects. A method for realizing eMPS in a CSFB mechanism is provided, so that a specific user with a CSFB priority access right is given the priority to fall back to a 2G or 3G network to acquire voice services in a CS domain, thereby ensuring conversation experience of the specific user. When network resources are limited or congested, the specific user can perform a normal voice conversation for the right acquired in time, thereby avoiding service rejection by a network side and ensuring that significant voice conversations, such as timely rescue, can be performed.

BRIEF DESCRIPTION OF THE DRAWINGS

To illustrate the technical solutions in the embodiments of the present invention or in the prior art more clearly, the accompanying drawings required for describing the embodiments or the prior art are introduced below briefly. Apparently, the accompanying drawings in the following descriptions merely show some of the embodiments of the present invention, and persons of ordinary skill in the art can obtain other drawings according to the accompanying drawings without creative efforts.

DETAILED DESCRIPTION OF THE EMBODIMENTS

The technical solutions of the embodiments of the present invention are hereinafter described clearly and completely with reference to the accompanying drawings in the embodiments of the present invention. Evidently, the described embodiments are only some embodiments of the present invention, rather than all embodiments of the present invention. All other embodiments obtained by persons of ordinary skill in the art based on the embodiments of the present invention without creative efforts shall fall within the protection scope of the present invention. In addition, the embodiments herein are all optional solutions of the present invention. The arranging sequence and the numbering of the embodiments are not related to their optimal execution sequence.

Embodiment 1

Figure 1:
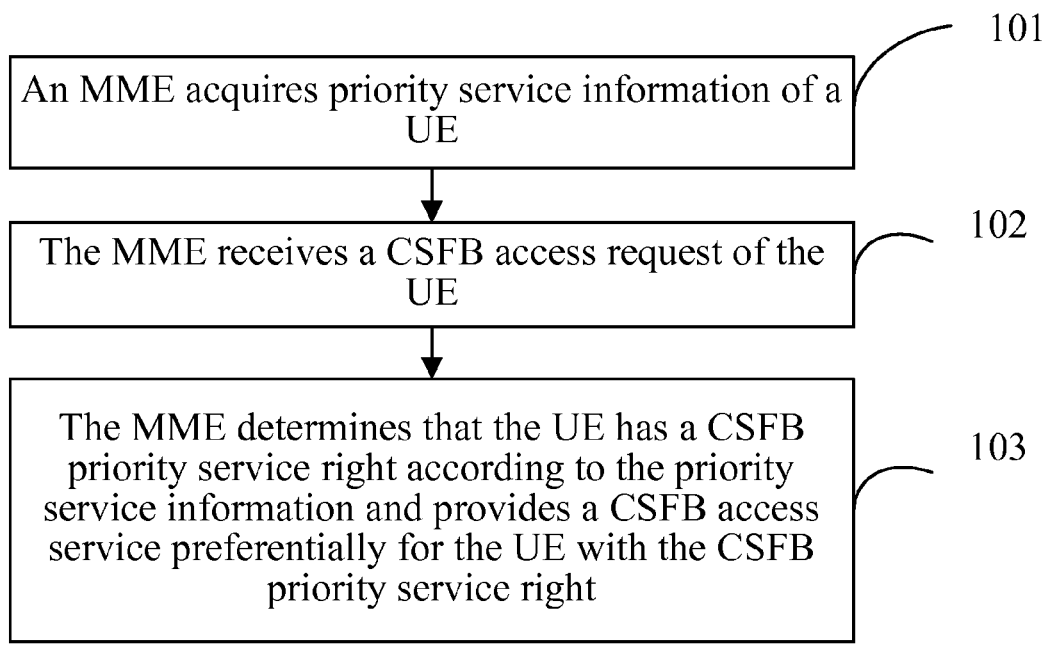
FIG. 1 is a schematic flow chart of a method for processing an eMPS in a CSFB mechanism in Embodiment 1 of the present invention.

The embodiment of the present invention provides a method for processing an eMPS in a CSFB mechanism, and as shown in FIG. 1, the method includes the following steps.

101: An MME acquires priority service information of a UE.

Specifically, with reference to a scenario shown in FIG. 2, 101 may be implemented in the following manner:

In an attachment process performed by the UE with a network side to access a network, an initial attachment process can be normally executed according to a standard in the prior art. The initial attachment process includes that, the UE which initiates the attachment process is already known to an MME, an MSC or a VLR (Visitor Location Register, visitor location register) and an HSS (being an MSC entity or VLR specifically depends on the deployment of the network side, and this part is unrelated to the embodiment, which is therefore no longer described here; however, the MSC entity in the embodiment and in the embodiments below all can be replaced by the VLR). That is, all the MME, MSC and HSS know with which UE the interaction is performed. In the embodiment, the UE with which the interaction is performed is set as UE1; and the attachment process continues to be normally performed according to the standard in the prior art until the MME sends a location update request message to the MSC entity to request location update, for example, the HSS transmits user subscription data in the CS domain of UE1 stored on the HSS to the MSC entity.

After the MSC entity receives the location update request message, the user subscription data in the CS domain of UE1 is checked to check whether the priority service information of UE1 exists. In the embodiment, it is assumed that the user subscription data in the CS domain of UE1 includes priority service information (if subscription information of the CS domain does not include the priority service information, it indicates that UE1 does not have an eMPS right or indicates other reasons, and in such case, UE1 is processed as a common user. Because this case is unrelated to the embodiment, no more consideration or explanation is made herein), the priority service information is added into a location update acknowledgment message and sent to the MME. That is to say, by using the location update acknowledgment message, the MME acquires the priority service information of UE1 stored on the MSC entity from the MSC entity.

In the embodiment, the priority service information may be eMPS priority information in the user subscription data in the CS domain, and may also be a priority service indication, where the specific form is not limited. In the embodiment and other embodiments, the eMPS refers to a service that the network side provides for the user equipment preferentially, and the eMPS may also be expressed with other names, which is not limited herein.

The eMPS priority information of the user subscription data includes:

an eMPS indicator for indicating whether UE1 is a UE that is accessed preferentially, for example, when an eMPS indicator is included, it indicates that UE1 is indicated to be the UE that is accessed preferentially, and when the eMPS indicator is not included, it indicates that UE1 is indicated to be not the UE that is accessed preferentially; and/or a priority level indicator of UE1, for example, the priority level indicator ranges from "1" to "N", where "1" indicates the highest priority level, "2" indicates the second high priority level, which is lower than the priority level of "1", the priority level of "3" is lower than the priority level of "2", . . . , and "N" indicates the lowest priority level.

It should be noted that the expression forms of the eMPS indicator and the priority level indicator are not limited.

When the priority service information includes the eMPS priority information, the MSC may add the priority service information in the user subscription data in the CS domain of UE1 stored on the MSC into the location update acknowledgment message and send the location update acknowledgment message to the MME; or when the priority service information includes the priority service indication of UE1, the MSC may determine whether UE1 has a CSFB priority service right according to the eMPS priority information of UE1 stored on the MSC, and add the determination result into the location update acknowledgment message as the priority service information in the form of the priority service indication and send the location update acknowledgment message to the MME.

After the MSC entity sends the location update acknowledgment message to the MME, the MME performs the required attachment process in the following, which is not repeated herein. The MSC may also be replaced by the VLR.

With reference to the scenario shown in FIG. 3, 101 may also be implemented in the following manner:

In the attachment process performed by UE1 with the network side to access the network, the initial attachment process may be normally executed according to the standard in the prior art. The initial attachment process includes that, which initiates the attachment process is already known to a base station, the MME, a service gateway, a packet data gateway, a policy and charging rules function and the HSS (Home Subscriber Server, home subscriber server). That is, it is already known that the interaction is performed with UE1; and UE1 sends a combined attach request message to the MME through the base station.

Figure 3:
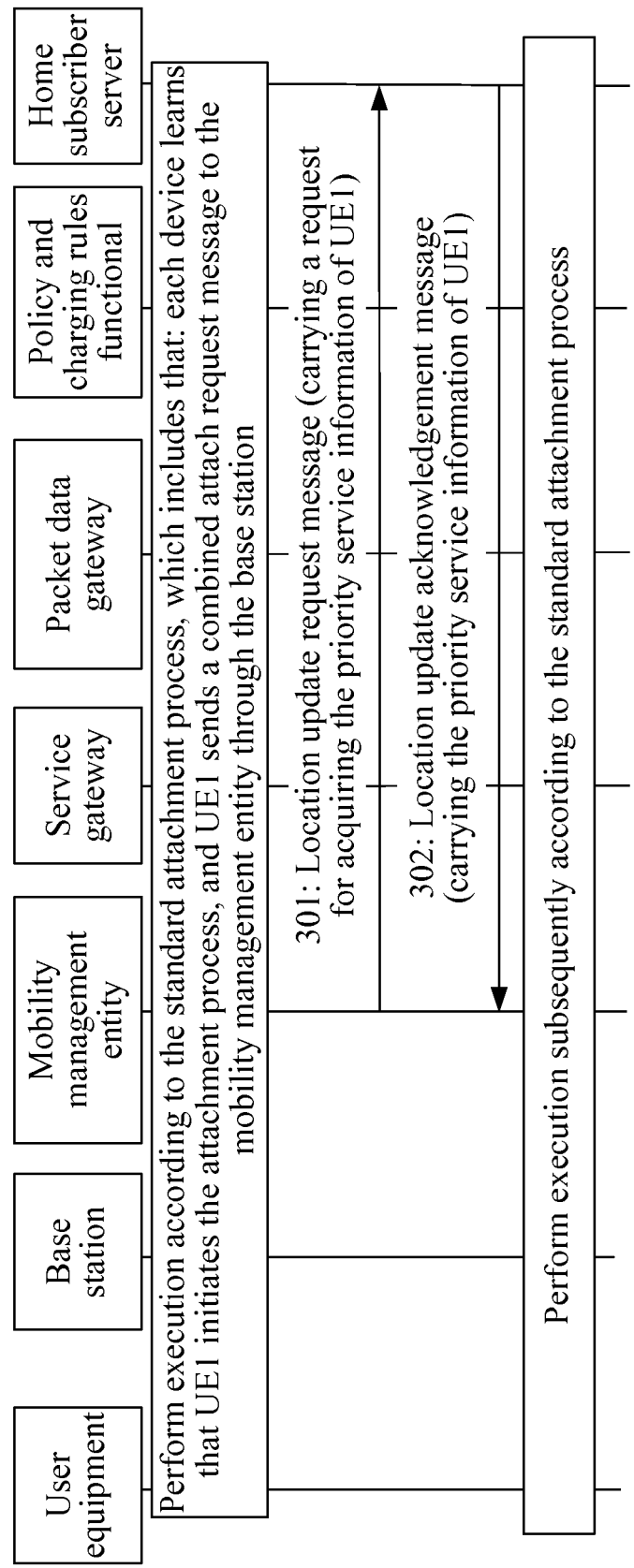
FIG. 3 is a schematic diagram of a scenario of another attachment process in Embodiment 1 of the present invention.

In such case, the MME may acquire the priority service information of UE1 stored on the HSS from the HSS by using the location update acknowledgment message, which, referring to FIG. 3, specifically includes:

301: After receiving the combined attach request message, the MME sends a location update request message to the HSS; and optionally, the location update request message may include a request for the priority service information of UE1.

302: According to the request for the priority service information of UE1 included in the message, the HSS adds the priority service information of UE1 stored on the HSS into the location update acknowledgment message and sends the location update acknowledgment message to the MME.

Alternatively, in 301, the inclusion of the request for the priority service information of UE1 in the location update request message is not regarded as an event triggering condition, but the receiving of the location update request message by the HSS is regarded as the event triggering condition. In such case, in step 302, after the location update request message is received, the HSS may check whether the priority service information is included in subscription data of UE1; if yes, the priority service information of UE1 is added into the location update acknowledgment message and sent to the MME; and if not, the location update acknowledgment message does not include the priority service information.

Figure 2:
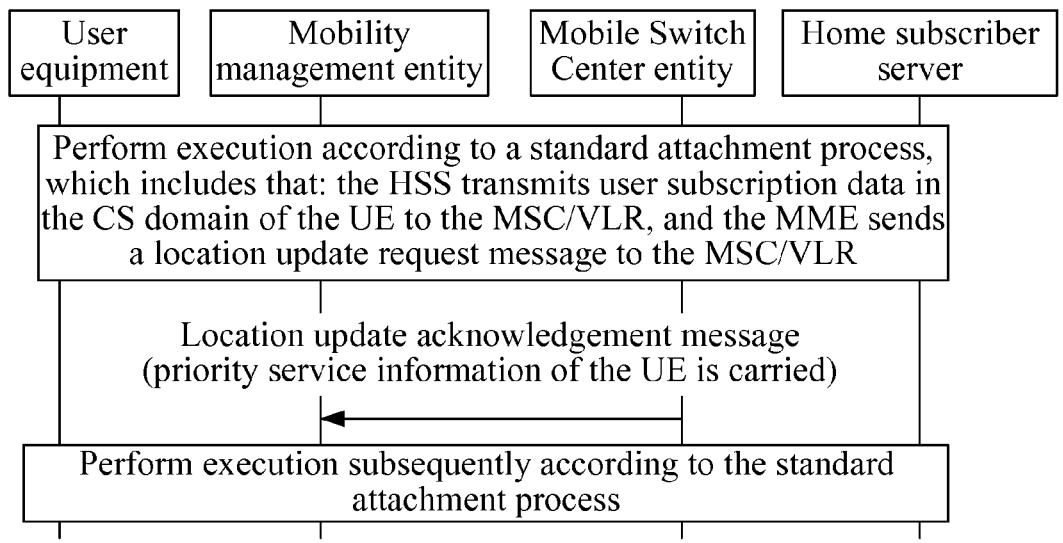
FIG. 2 is a schematic diagram of a scenario of an attachment process in Embodiment 1 of the present invention.

The priority service information acquired by the MME in 301 is the same as the priority service information in a scenario shown in FIG. 2, and according to a design requirement, the priority service information may be the eMPS priority information in the user subscription data in the CS domain and the information may also be the priority service indication. For detailed content of the eMPS priority information of the user subscription data, refer to the description above.

Correspondingly, when the priority service information includes the eMPS priority information in the user subscription data in the CS domain, the HSS in 302 may directly add eMPS priority information into the location update acknowledgment message as the priority service information and send the location update acknowledgment message to the MME; when the priority service information includes the priority service indication, the HSS in 302 may be required to determine whether UE1 has the CSFB priority service right according to the eMPS priority information of UE1 stored on the HSS, and add the determination result into the location update acknowledgment message as the priority service information in the form of the priority service indication and send the location update acknowledgment message to the MME.

The continued attachment process may be normally performed according to the standard in the prior art, which includes: establishing an air interface and a wireless side bearer, and notifying the service gateway to update a bearer address until UE1 completes network attachment. The detailed description is not repeated herein.

102: The MME receives a CSFB access request of the UE.

Figure 4:
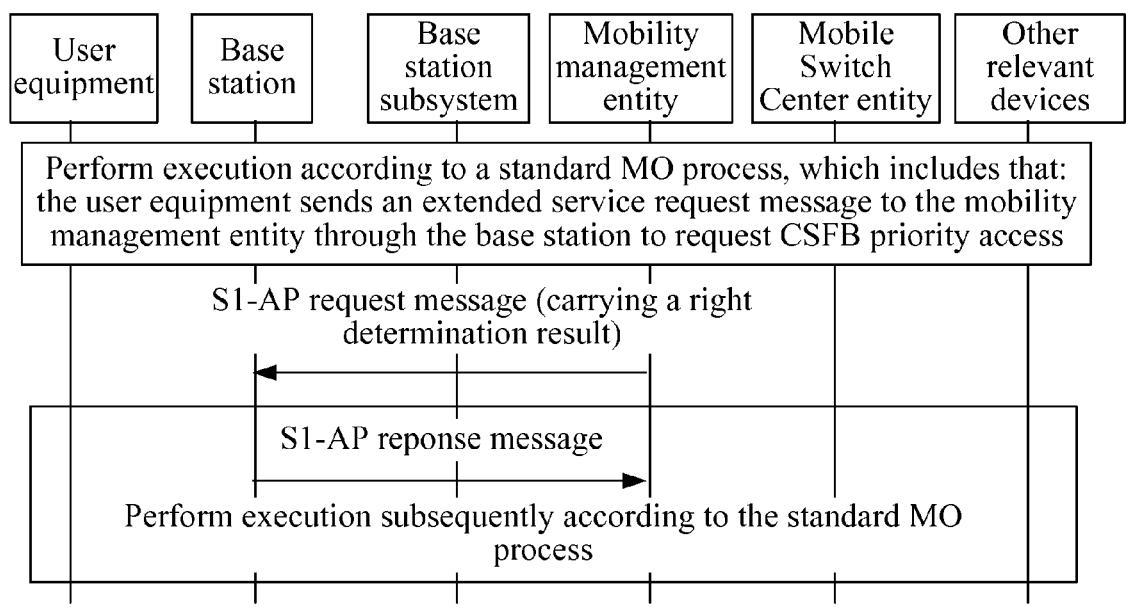
FIG. 4 is a schematic diagram of a scenario of an MO process in Embodiment 1 of the present invention.

Specifically, with reference to that the CSFB access request is a CSFB priority access request, and in the scenario shown in FIG. 4, 102 may be implemented in the following manner: in an MO process of UE1, including: when an RRC (Radio Resource Control, radio resource control) connection is established between UE1 and the base station, adding the CSFB priority access request into an RRC Establishment cause (RRC establishment cause) message and notifying the base station that UE1 requests CSFB priority access; when the base station establishes an S1 connection with the MME, adding the CSFB priority access request into an Initial UE context (initial UE context) message and notifying the MME that UE1 requests CSFB priority access; after the RRC connection and the S1 connection are both established, sending, by UE1, an extended service request message to the MME to request the CSFB priority access. These parts can all be performed according to the existing standard until the MME receives the extended service request message including the CSFB access request from UE1.

It should be noted that, step 101 and step 102 do not have a strict sequence during execution.

103: The MME determines that the user equipment has the CSFB priority service right according to the priority service information and provides a CSFB access service preferentially for the user equipment with the CSFB priority service right.

The CSFB priority service right mentioned in the embodiment of the present invention may be a priority service right in a CS voice domain of the user and may also be the service right separately set, for the user, whether to execute a CSFB preferentially, where the specific form is not limited in the embodiment of the present invention, and the priority service right that allows the user to access the network preferentially in a CSFB process may all be called the CSFB priority service right. Correspondingly, the information for expressing the CSFB priority service right of the user may be called CSFB priority service information.

After the MME determines that UE1 has the CSFB priority service right, in the CSFB process, if resources are limited (for example, the congested network leads to the limited resources), it is possible to enable UE1 to preferentially fall back to the CS domain to execute a corresponding service, such as a voice service; it is also possible to preferentially execute a CSFB service of UE1 when the resources are not limited; and when the resources are limited, it is possible to reject the process that the user equipment without the CSFB priority service right falls back to the CS domain.

Because in the attachment process of 101, the MME acquires the priority service information of UE1 from the MSC or the HSS, the MME may determine the CSFB priority service right requested by UE1 according to the priority service information.

Referring to the scenario shown in FIG. 4, an implementation of 103 is as follows:

When the acquired priority service information is the eMPS priority information of the user subscription data, the determining the CSFB priority service right requested by the user equipment according to the priority service information includes the following:

The MME determines the priority service indication of UE1 according to the eMPS priority information; if the priority service indication indicates that UE1 has a CSFB priority access right, determining that UE1 has the right to preferentially fall back to the CS domain; and otherwise, determines that UE1 does not have the right to preferentially fall back to the CS domain.

For example, the MME determines, according to the eMPS priority information, that the priority service indication of UE1 indicates that UE1 has the right. That is, the indication indicates that UE1 has the CSFB priority access right. Then, the MME determines that UE1 has the right to preferentially fall back to the CS domain.

When the acquired priority service information is the priority service indication, the determining the CSFB priority service right requested by the user equipment according to the priority service information includes:

If the priority service indication indicates that UE1 has the CSFB priority access right, the MME gives UE1 the right to preferentially fall back to the CS domain; and otherwise, the MME determines that UE1 does not have the right to preferentially fall back to the CS domain.

It should be noted that, 102 is described specifically by using the following case as an example: the CSFB access request is the CSFB priority access request. In fact, the CSFB access request cannot be the CSFB priority access request, but only is a pure CSFB access request, and in such case, the specific execution method is similar to the processes in the aforementioned 102 and 103, and a major difference is that: in the specific execution of 102, the CSFB priority access request does not need to be added into the message, and the CSFB access request is not limited to being sent in the MO process and the CSFB access request may be sent to the MME at any time when UE1 wants to fall back to the CS domain; correspondingly, in the specific execution of 103, it is also not limited to the MO process, and the receiving of the CSFB access request of UE1 at any time is regarded as the triggering condition and the step in 103 that the MME determines the CSFB priority service right requested by the user equipment according to the priority service information is performed. The step includes the following:

After receiving the CSFB access request sent by UE1, the MME determines that UE1 has the priority service right according to the acquired CSFB priority service information, thereby providing the CSFB access service preferentially for the user equipment with the CSFB priority service right. That is, when the resources are limited, it is processed that the user equipment with the CSFB priority service right is allowed to preferentially fall back to the CS domain, and it is possible to reject the process that the user equipment without the CSFB priority service right falls back to the CS domain.

After 103, the MME notifies the result of determining that the user equipment has the CSFB priority service right to the base station. Specifically, by using an S1-AP request message, the right result may be carried to the base station, so that the CSFB priority access right of UE1 is notified to the base station. After learning that UE1 has the CSFB priority access right, the base station may process the message of UE1 preferentially. For example, the base station requests a measurement report from UE1 preferentially and searches for a handover target (namely, a 2G or 3G network cell) of UE1. The notifying of the result of determining that the user equipment has the CSFB priority service right to the base station by the MME may include: carrying the priority service indication to the base station directly by using the S1-AP request message; or notifying the determined information that UE1 has the right to preferentially fall back to the CS domain to the base station by using the S1-AP request message, so that the base station is able to learn that UE1 has the right to preferentially fall back to the CS domain; or notifying the determined information that UE1 does not have the right to preferentially fall back to the CS domain to the base station by using the S1-AP request message.

The subsequent execution method can continue to complete the MO process according to the existing standard, which includes that: the base station sends an S1-AP response message to the MME, and if packet switched domain (PS) switching is supported, a packet switched domain service may also be executed after being switched to a 2G or 3G network.

By using the method provided in the embodiment, the MME may determine whether the UE has the right to preferentially fall back to the CS domain according to the acquired CSFB priority service information; and if yes, the UE falls back to the CS domain preferentially. Therefore, an eMPS service in the CSFB mechanism is implemented, so that a specific user with the right to fall back to the CS domain preferentially may acquire a corresponding priority service; and furthermore, the following problem may be prevented: a specific user cannot perform a voice conversation normally as the right is not acquired in time due to the congested network or the limited resources, which might delay the processing of an important event.

Embodiment 2

Figure 5:
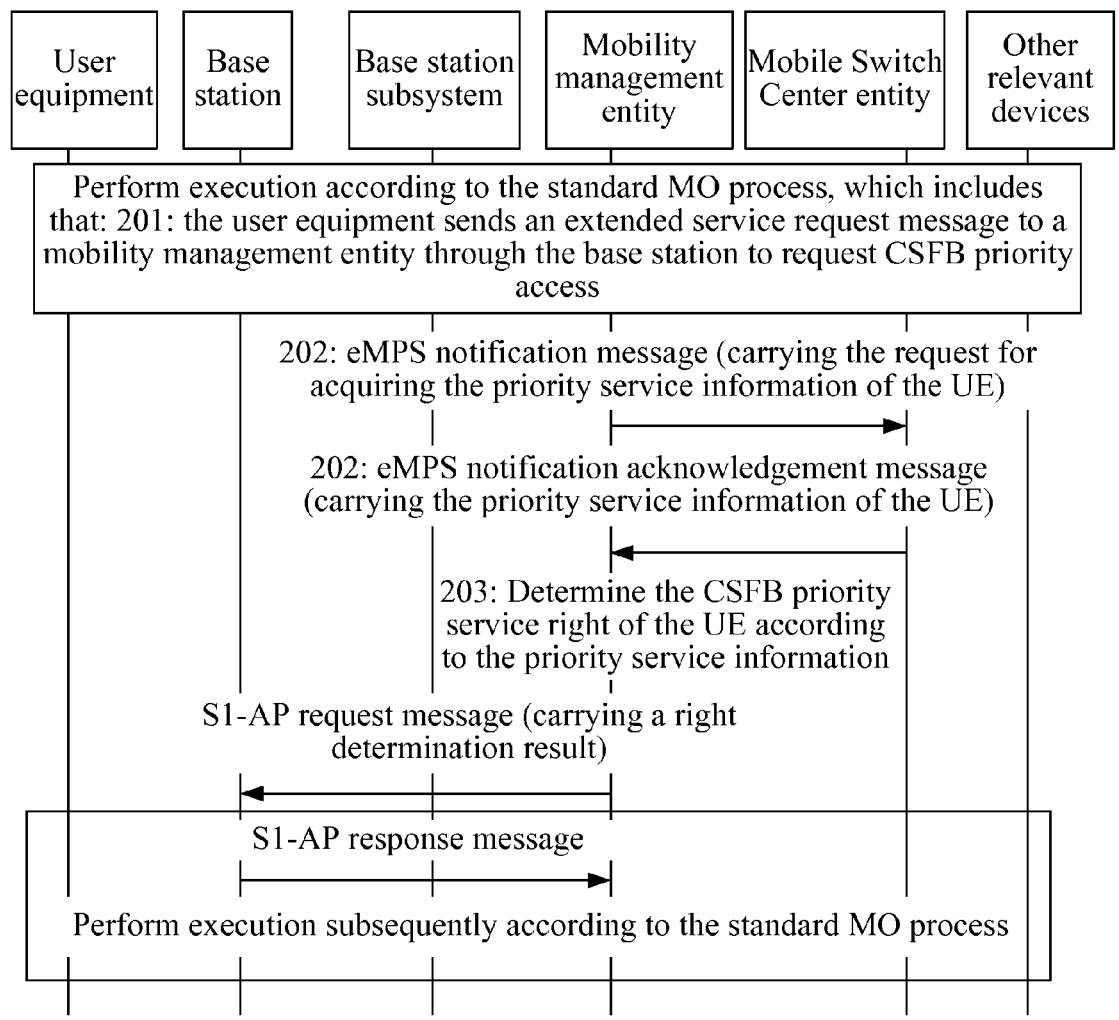
FIG. 5 is a schematic diagram of a method for processing an eMPS in a CSFB mechanism in Embodiment 2 of the present invention.

Specifically with reference to a scenario shown in FIG. 5, the embodiment provides a method for processing an eMPS in a CSFB mechanism. A major difference between the method in the embodiment and the method in Embodiment 1 is that, which involves only that a UE that requests for a CSFB priority access is given the right in an MO process.

The method includes the following steps:

201: In an MO process, a UE sends an extended service request message to an MME to request CSFB priority access.

References may be made to a specific implementation of 102 for 201, which is not repeated herein.

202: After the MME receives the extended service request, the MME sends a request message to an MSC to request priority service information of the UE. After receiving the message, the MSC sends the priority service information of the UE to the MME by using a response message.

Specifically, the UE is set as UE1.

After receiving the extended service request, the MME requests the priority service information of the UE from the MSC by using an eMPS notification message. After receiving the eMPS notification message, the MSC detects user subscription data in the CS domain of UE1 stored on the MSC and check whether the priority service information of UE1 exists. In the embodiment, it is assumed that the priority service information of UE1 is found (if not, it indicates that UE1 does not have an eMPS right or indicates other reasons, and in such case, UE1 is processed as a common user. Because this situation is unrelated to the embodiment, no more consideration or explanation is made herein) and the priority service information is added into an eMPS notification acknowledgment message and send the eMPS notification acknowledgment message to the MME.

The priority service information may be eMPS priority information in the user subscription data in the CS domain, and may also be a priority service indication.

When the priority service information is the eMPS priority information in the user subscription data, the eMPS priority information includes:

an eMPS indicator for indicating whether UE1 is a UE that is accessed preferentially, for example, when an eMPS indicator is included, it indicates that UE1 is indicated to be the UE that is accessed preferentially, and when the eMPS indicator is not included, it indicates that UE1 is indicated to be not the UE that is accessed preferentially; and/or a priority level indicator of UE1, for example, the priority level indicator ranges from "1" to "N", where "1" indicates the highest priority level, "2" indicates the second high priority level, which is lower than the priority level of "1", the priority level of "3" is lower than the priority level of "2", . . . , and "N" indicates the lowest priority level.

The expression forms of the eMPS indicator and the priority level indicator are not limited.

In the embodiment, when the priority service information includes the eMPS priority information, the MSC may add the eMPS priority information in the user subscription data of UE1 acquired by or stored on the MSC into the eMPS notification acknowledgment message as the priority service information and send the eMPS notification acknowledgment message to the MME; or when the priority service information includes the priority service indication of UE1, the MSC determines whether UE1 has a CSFB priority service right according to the eMPS priority information stored on the MSC, and adds the determination result into the notification acknowledgment message as the priority service information in the form of the priority service indication and send the notification acknowledgment message to the MME.

203: The MME determines that the user equipment has the CSFB priority service right according to the priority service information and provides a CSFB access service preferentially for the user equipment with the CSFB priority service right. That is: when the resources are limited, it is processed that the user equipment with the CSFB priority service right is allowed to preferentially fall back to the CS domain, and it is possible to reject the process that the user equipment without the CSFB priority service right falls back to the CS domain.

Because the priority service information acquired by the MME in 202 may be the eMPS priority information of the user subscription data and may also be the priority service indication, there are two cases in 203 correspondingly.

When the priority service information is the eMPS priority information of the user subscription data, the determining the CSFB priority service right requested by the user equipment according to the priority service information includes:

determining the priority service indication of UE1 according to the eMPS priority information; and if the priority service indication indicates that UE1 has the CSFB priority access right, determining that UE1 has the right to preferentially fall back to the CS domain; and otherwise, determining that UE1 does not have the right to preferentially fall back to the CS domain.

When the priority service information is the priority service indication, the determining the CSFB priority service right requested by the user equipment according to the priority service information includes:

if the priority service indication indicates that UE1 has the CSFB priority access right, determining that UE1 has the right to preferentially fall back to the CS domain; and otherwise, determining that UE1 does not have the right to preferentially fall back to the CS domain.

After 203, the MME may notify the result of determining that the user equipment has the CSFB priority service right to a base station. Specifically, by using an S1-AP request message, a right result may be carried to the base station, so that the CSFB priority access right of UE1 is notified to the base station. After learning that UE1 has the CSFB priority access right, the base station processes the message of UE1 preferentially. For example, the base station requests a measurement report from UE1 preferentially and searches for a handover target (namely, a 2G or 3G network cell) of UE1. The right result may be notified to the base station by using the S1-AP request message that carries the priority service indication; and the right result may also be: the determined information that UE1 has the right to preferentially fall back to the CS domain is notified to the base station by using the S1-AP request message, so that the base station may enable UE1 to preferentially fall back to the CS domain. Alternatively, the determined information that UE1 does not have the right to preferentially fall back to the CS domain is notified to the base station by using the S1-AP request message.

A subsequent execution method may continue to complete the MO process according to an existing standard, which includes that: the base station sends an S1-AP response message to the MME, and if packet switched domain (PS) switching is supported, a packet switched domain service may also be executed after being switched to a 2G or 3G network.

By using the method provided in the embodiment, in the MO process, the corresponding priority service information is acquired for the UE that requests CSFB priority access and the process of determining whether the UE has the right to preferentially fall back to the CS domain is completed, so as to enable a specific user with the eMPS right to get a service that is processed preferentially in the CSFB mechanism, thereby ensuring voice conversation experience of the specific user and preventing the problem that a network rejects to serve the specific user due to the busy network or limited resources, which might delay the processing of an important event.

Embodiment 3

Figure 6:
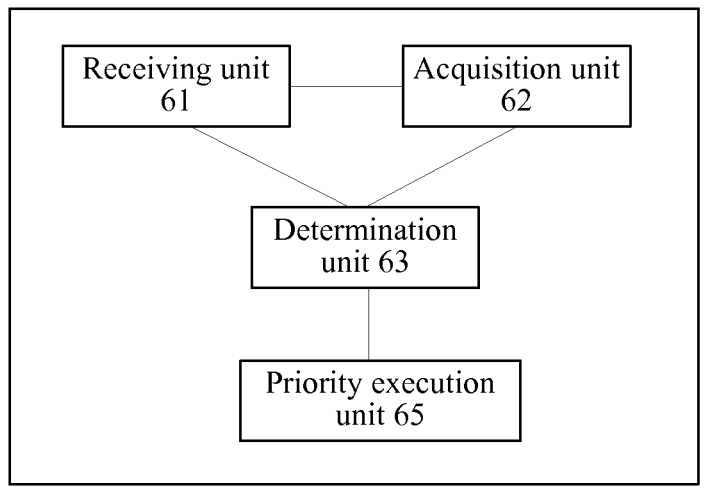
FIG. 6 is a schematic structural diagram of an apparatus for processing an eMPS in a CSFB mechanism in Embodiment 3 of the present invention.

The embodiment provides an apparatus for processing an eMPS in a CSFB mechanism. As shown in FIG. 6, the apparatus includes: a receiving unit 61, an acquisition unit 62, a determination unit 63 and a priority execution unit 65.

The receiving unit 61 is configured to receive a CSFB priority access request of a UE; the acquisition unit 62 is configured to acquire priority service information of the UE; the determination unit 63 is configured to: after the receiving unit 61 receives the CSFB priority access request, determine that the UE has a CSFB priority service right according to the priority service information of the user equipment acquired by the acquisition unit 62; and the priority execution unit 65 is configured to provide a CSFB access service preferentially for the user equipment with the CSFB priority service right determined by the determination unit 63.

Figure 7:
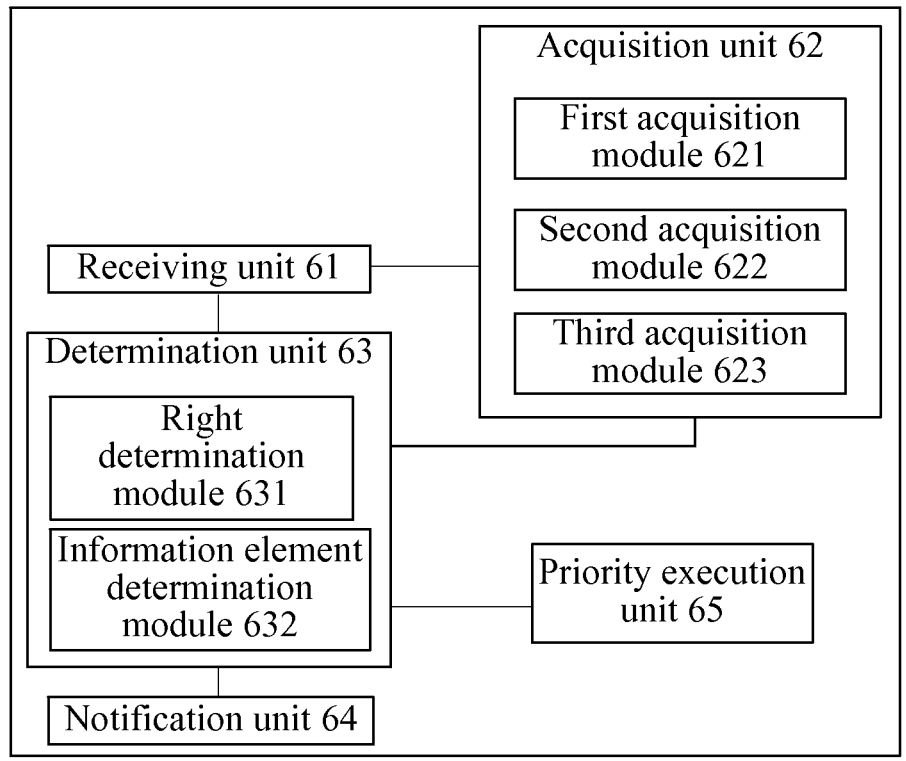
FIG. 7 is a schematic structural diagram of an apparatus for processing an eMPS in a CSFB mechanism in another embodiment of the present invention.

Another embodiment of the present invention further provides an apparatus for processing an eMPS in a CSFB mechanism. As shown in FIG. 7, in the embodiment, the acquisition unit 62 may include at least one of the following: a first acquisition module 621 and a second acquisition module 622.

The first acquisition module 621 is configured to, in an attachment process, acquire the priority service information of the UE stored on an MCS entity or a VLR from the MSC entity or the VLR by using a location update acknowledgment message; and the second acquisition module 622 is configured to, in the attachment process, acquire the priority service information of the UE stored on an HSS from the HSS by using the location update acknowledgment message.

In another embodiment of the present invention, when a CSFB access request received by the receiving unit 61 is the CSFB priority access request, the acquisition unit 62 includes a third acquisition module 623 correspondingly.

The third acquisition module 623 is configured to, in a mobile originating process, request the priority service information of the UE from the MSC entity or the VLR by using a request message and acquire the priority service information of the UE stored on the MSC entity or the VLR from the MSC entity or the VLR by using a response message.

As shown in FIG. 7, in another embodiment, the determination unit 63 includes: a right determination module 631 and/or an information element determination module 632.

The right determination module 631 is configured to, when the priority service information of the UE acquired by the acquisition unit 62 includes eMPS priority information of user subscription data, determine a priority service indication of the UE according to the eMPS priority information, and if the priority service indication indicates that the UE has a CSFB priority access right, determine that the UE has a right to preferentially fall back to a circuit switched domain.

The information element determination module 632 is configured to, when the priority service information of the UE acquired by the acquisition unit 62 includes the priority service indication, and if the priority service indication indicates that the UE has a CSFB priority access right, determine that the UE has a right to preferentially fall back to a circuit switched domain.

In addition, optionally, in an apparatus provided in the other embodiment, a notification unit 64 is further included.

The notification unit 64 is configured to notify the result of determining that the user equipment has the CSFB priority service right to a base station to enable the base station to provide a CSFB access service preferentially for the user equipment with the CSFB priority service right.

The apparatus for processing the eMPS in the CSFB mechanism provided in the embodiment may be used as the MMEs in Embodiment 1 and Embodiment 2, and may also be installed or operated in the MMEs in Embodiment 1 and Embodiment 2.

The apparatus provided in the embodiment has the following beneficial effects. Through the function of the apparatus that the priority service information is acquired from a network device on which the priority service information is stored and it is determined whether the requesting UE has the right to preferentially fall back to the CS domain according to the priority service information, a specific user with the CSFB priority access right may be given the priority, so as to enable the specific user to preferentially fall back to a 2G or 3G network to execute voice services, thereby ensuring conversation experience of the specific user; when the network resources are limited or the network is congested, the specific user can perform a normal voice conversation because the right is acquired in time, thereby preventing the case that the service is rejected by a network side and ensuring that important voice conversations such as timely rescue can be performed.

Embodiment 4

The embodiment provides a system for processing an eMPS in a CSFB mechanism. The system mainly includes a mobility management entity.

The mobility management entity is configured to receive a CSFB access request of a UE, determine that the UE has a CSFB priority service right according to acquired priority service information of the UE, and provide a CSFB access service preferentially for the UE with the CSFB priority service right.

Furthermore, in the embodiment, the system further includes a first network management device.

The first network management device is configured to, in an attachment process, send the priority service information of the UE stored on the first network management device to the mobility management entity by using a location update acknowledgment message; and correspondingly, the mobility management entity is further configured to, in the attachment process, acquire the priority service information of the user equipment from the first network management device by using the location update acknowledgment message.

Alternatively, the system further includes a second network management device.

The second network management device is configured to, in a mobile originating process, receive a request message for acquiring the priority service information of the UE from the mobility management entity and send the priority service information of the UE stored on the second network management device to the mobility management entity by using a response message; and in such case, correspondingly, the mobility management entity is further configured to, in the mobile originating process, send the request message to the second network management device to acquire the priority service information of the UE and acquire the priority service information of the UE by using the response message sent by the second network management device.

The first network management device may be an HSS, an MSC or a VLR, and the second network management device may be the MSC or the VLR.

In the system provided in the embodiment, the mobility management entity may acquire the priority service information and determine, according to the priority service information, a right for a user that requests CSFB priority access. The eMPS is implemented in the CSFB mechanism, so that it can be avoided that a network side rejects to service a user with an eMPS priority access right and it is ensured that the user with the eMPS priority access right gets the corresponding service in the CSFB.

Through descriptions of the methods in the preceding embodiments, a person skilled in the art may clearly understand that the present invention may be implemented through software by combining a necessary general hardware platform, or through hardware. In most cases, however, the former is a preferred implementation manner. Based on such understanding, the technical solutions in the present invention may be essentially or the part that contributes to the prior art may be embodied in the form of a software product. This computer software product is stored on a readable storage medium, such as a floppy disk, hard disk and compact disk of a computer, and includes several instructions that are configured for a network device to execute the method provided in each of the preceding embodiments of the present invention.

In conclusion, the above are merely specific implementation manners of the present invention. However, the scope of the present invention is not limited thereto. Changes or replacements readily apparent to a person skilled in the prior art within the technical scope of the present invention should fall within the protection scope of the present invention. Therefore, the protection scope of the present invention is subject to the appended claims.

What is claimed is:

1. A system for processing an enhanced multimedia priority service (eMPS) in a circuit switched fallback (CSFB) mechanism, comprising:
a mobility management entity (MME) and a base station;
wherein the MME is configured to:
receive a CSFB access request of a user equipment (UE),
determine whether the UE has a CSFB priority service right according to priority service information of the UE, where the priority service information is made available to the MME from a home subscriber server (HSS) during attachment of the UE, and
when it is determined that the UE has the CSFB priority service right, send an S1 Application Protocol (S1-AP) request message carrying a priority service indication to the base station; and
the base station is configured to:
receive the S1-AP request message from the MME,
according to the priority service indication, enable the UE to fall back to a circuit switched (CS) domain.

2. The system according to claim 1, wherein the base station is configured to request a measurement report from the UE.

3. The system according to claim 1, wherein the base station is configured to search for a second-generation (2G) or third-generation (3G) cell for the UE.

4. The system according to claim 1, wherein the base station is further configured to send an S1-AP response message to the MME in response to the S1-AP request message.

5. The system according to claim 1, wherein the base station is further configured to send the CSFB access request to the MME.

6. The system according to claim 1, wherein the system further comprises the UE configured to send the CSFB access request to the base station.

7. A base station, comprising:
a processor; and
a computer readable storage medium storing programming for execution by the processor, when executed the programming causes the processor to:
send a circuit switched fallback (CSFB) access request of a user equipment (UE) to a mobility management entity (MME);
receive an S1 Application Protocol (S1-AP) request message from the MME;
determine an priority service indication carried in the S1-AP request message, wherein the priority service indication indicates the UE has a CSFB priority service right, and the priority service indication is added into the S1-AP request message according to priority service information which is made available to the MME from a home subscriber server (HSS) during attachment of the UE;
enable the UE to fall back to a circuit switched (CS) domain.

8. The base station according to claim 7, wherein the processor is further configured to request a measurement report from the UE.

9. The base station according to claim 7, wherein the processor is further configured to search for a second-generation (2G) or third-generation (3G) cell for the UE.

10. The base station according to claim 7, wherein the processor is further configured to receive the CSFB access request from the UE.

11. The base station according to claim 7, wherein the processor is further configured to send an S1-AP response message to the MME in response to the S1-AP request message.

12. The base station according to claim 7, wherein the processor is further configured to send the CSFB access request to the MME.

13. A method for processing an enhanced multimedia priority service (eMPS) in a circuit switched fallback (CSFB) mechanism, comprising:
sending, by a base station, a CSFB access request of a user equipment (UE) to a mobility management entity (MME);
receiving, by the base station, an S1 Application Protocol (S1-AP) request message from the MME;
determining, by the base station, an priority service indication carried in the S1-AP request message, wherein the priority service indication indicates the UE has a CSFB priority service right, and the priority service indication is added into the S1-AP request message according to priority service information which is made available to the MME from a home subscriber server (HSS) during attachment of the UE;
enabling, by the base station, the UE to fall back to a circuit switched (CS) domain.

14. The method according to claim 13, wherein making, by the base station, the UE fall back to the circuit switched (CS) domain comprises:
requesting, by the base station, a measurement report from the UE.

15. The method according to claim 13, wherein making, by the base station, the UE fall back to the circuit switched (CS) domain comprises:
searching, by the base station, for a second-generation (2G) or a third-generation (3G) cell for the UE.

16. The method according to claim 13, further comprising:
receiving, by the base station, the CSFB access request from the UE.

17. The method according to claim 13, further comprising:
sending, by the base station, an S1-AP response message to the MME in response to the S1-AP request message.

18. The method according to claim 13, further comprising:
sending, by the base station, the CSFB access request to the MME.

* * * * *